(12) United States Patent
Tsukagoshi et al.

(10) Patent No.: US 7,542,185 B2
(45) Date of Patent: Jun. 2, 2009

(54) HOLOGRAPHIC RECORDING MEDIUM, HOLOGRAPHIC RECORD ERASING METHOD, AND HOLOGRAPHIC RECORDING AND REPRODUCING APPARATUS

(75) Inventors: Takuya Tsukagoshi, Sagamihara (JP); Jiro Yoshinari, Tokyo (JP); Hideaki Miura, Tokyo (JP); Tetsuro Mizushima, Moriguchi (JP)

(73) Assignee: TDK Corporation, Tokyo (JP)

( * ) Notice: Subject to any disclaimer, the term of this patent is extended or adjusted under 35 U.S.C. 154(b) by 235 days.

(21) Appl. No.: 10/583,662

(22) PCT Filed: Nov. 29, 2004

(86) PCT No.: PCT/JP2004/017721

§ 371 (c)(1),
(2), (4) Date: Jun. 21, 2006

(87) PCT Pub. No.: WO2005/064420

PCT Pub. Date: Jul. 14, 2005

(65) Prior Publication Data

US 2007/0109618 A1 May 17, 2007

(30) Foreign Application Priority Data

Dec. 25, 2003 (JP) .............................. 2003-430471

(51) Int. Cl.
*G03H 1/02* (2006.01)
*G03H 1/04* (2006.01)

(52) U.S. Cl. .................................. 359/3; 359/35; 430/1

(58) Field of Classification Search ...................... 359/1, 359/3, 35; 430/1, 2
See application file for complete search history.

(56) References Cited

U.S. PATENT DOCUMENTS

| 4,815,800 | A | * | 3/1989 | Chern et al. | 359/3 |
| 4,958,892 | A | * | 9/1990 | Jannson et al. | 359/15 |
| 5,162,927 | A | * | 11/1992 | Moss et al. | 359/3 |
| 6,322,932 | B1 | * | 11/2001 | Colvin et al. | 430/2 |
| 6,483,611 | B1 | * | 11/2002 | Mizutani et al. | 359/3 |

FOREIGN PATENT DOCUMENTS

| JP | A-02-179673 | 7/1990 |
| JP | A-2001-006215 | 1/2001 |

* cited by examiner

*Primary Examiner*—Audrey Y Chang
(74) *Attorney, Agent, or Firm*—Oliff & Berridge, PLC

(57) ABSTRACT

A holographic record erasing method and a holographic recording and reproducing apparatus in which data reproduction can be disabled without irradiating a holographic recording medium with a high energy erasing beam or physically destroying the medium. A holographic recording medium 16 in a holographic recording and reproducing apparatus 10 has a recording layer 17 formed of two split recording layers 17A and 17B, and a crosstalk layer 17C is provided therebetween. The crosstalk 17C layer still has photosensitivity after completion of multiplex recording of data holograms 24 in the recording layer 17. An object beam IOb for erasing and a reference beam IRe for erasing each having a large beam diameter are projected onto the layer to form a crosstalk hologram 26 having low selectivity. Hence, when a reproduction beam is projected onto the data holograms 24, a diffraction beam is always generated also from the crosstalk hologram 26.

7 Claims, 8 Drawing Sheets

(A)

(B)

HOLOGRAPHIC RECORDING MEDIUM, HOLOGRAPHIC RECORD ERASING METHOD, AND HOLOGRAPHIC RECORDING AND REPRODUCING APPARATUS

TECHNICAL FIELD

This invention relates to a holographic recording medium for recording information through interference fringes resulting from the projection of an object beam and a reference beam onto the holographic recording medium, to a holographic record erasing method for disabling the reproduction of the information recorded in this holographic recording medium, and to a holographic recording and reproducing apparatus.

BACKGROUND ART

Holographic recording has received attention as one of high-speed large-capacity storage techniques.

In this holographic recording, the refractive index of a recording layer material in a recording layer of a holographic recording medium is changed according to interference fringes of an object beam and a reference beam to thereby form a hologram.

The hologram formed in the recording layer of the holographic recording medium according to the interference fringes of the object beam and the reference beam as mentioned above cannot be easily erased in contrast to the case for a magnetic recording medium.

Therefore, conventionally, when a holographic recording medium is, for example, discarded, the holographic recording medium is irradiated with a high energy erasing beam or is physically destroyed. Since no other means can be employed, problems exist that data erasing is complicated and the processing cost is high.

DISCLOSURE OF THE INVENTION

This invention has been made in view of the above problems. Accordingly, it is an object of the invention to provide a holographic recording medium, a holographic record erasing method, and a holographic recording and reproducing apparatus in which data reproduction can be disabled at low cost without irradiating the holographic recording medium with a high energy erasing beam or physically destroying the medium.

The present inventors have conducted intensive studies and consequently found that data reproduction can be disabled by providing, adjacent to a recording layer in which data holograms are formed, a crosstalk layer which does not fully react to an object beam and a reference beam each projected for forming the data holograms, and forming crosstalk holograms having low selectivity in the crosstalk layer in a superposed manner to thereby cause the crosstalk holograms to be always reproduced at the time of the reproduction of the data holograms.

In summary, the above-described objectives are achieved by the following embodiments of the present invention.

(1) A holographic recording medium having a recording layer which is multiplex recordable and is provided between a first substrate and a second substrate, wherein a crosstalk layer having a thickness of 0.48 µm or more is provided directly on the recording layer or adjacent to the recording layer with a spacer layer interposed therebetween, the crosstalk layer being set to exhibit no sensitivity or very low sensitivity to interference fringes of an object beam and a reference beam at the time of data hologram recording in the recording layer.

(2) The holographic recording medium according to (1), wherein: the recording layer has a thickness of $t_1$; N data holograms can be angle-multiplex-recorded in one point in the recording layer; and a thickness $t_2$ of the crosstalk layer is $t_2 < t_1/N$.

(3) The holographic recording medium according to (1) or (2), wherein the crosstalk layer is arranged on a side of the recording layer, the side being opposite to an incident side of the object beam and the reference beam at the time of recording.

(4) The holographic recording medium according to (1) or (2), wherein the crosstalk layer is provided between two layers of the recording layer such that the recording layer is split into the two layers.

(5) The holographic recording medium according to (1), (2) or (3), wherein a spacer layer made of a resin is provided between the recording layer and the crosstalk layer.

(6) A holographic record erasing method, comprising forming a crosstalk hologram in a crosstalk layer in a superposed manner with respect to data holograms multiplex-recorded in a recording layer of a holographic recording medium, the crosstalk layer being provided substantially adjacent to the recording layer and being set to exhibit no sensitivity or very low sensitivity to interference fringes of an object beam and a reference beam at the time of data hologram recording in the recording layer.

(7) The holographic record erasing method according to (6), wherein: data holograms are angle-multiplex-recorded; and the reference beam for erasing has a beam diameter upon the projection onto the holographic recording medium 2 to 10 times the diameter of a beam which is projected onto the holographic recording medium at the time of data hologram recording.

(8) The holographic record erasing method according to (7), wherein the reference beam for erasing is projected onto the holographic recording medium at an incident angle within an incident angle modulation range of the reference beam at the time of recording.

(9) The holographic record erasing method according to (7) or (8), wherein the reference beam for erasing is projected simultaneously or sequentially at a plurality of incident angles at an angular interval which corresponds to a plurality of angular pitches between the data holograms.

(10) The holographic record-erasing method according to any one of (6) to (9), wherein the object beam for erasing is subjected to random amplitude modulation.

(11) The holographic record erasing method according to any one of (6) to (10), wherein the object beam for erasing is projected through an objective lens having a numerical aperture smaller than a numerical aperture of an objective lens for projecting the object beam at the time of recording.

(12) The holographic record erasing method according to (6), wherein: the data holograms are phase-code-multiplex-recorded; and the reference beam for erasing is subjected to phase-code-modulation by means of a pattern which is not orthogonal to a phase-code employed at the time of recording.

(13) A holographic recording and reproducing apparatus comprising a holographic recording medium having a recording layer provided between a first substrate and a second substrate, a laser beam source, and an object optical system and a reference optical system which guide an object beam and a reference beam, respectively, split from a laser beam from this laser beam source to the holographic recording medium, in which the object beam and the reference beam are projected onto the recording layer to thereby form data holograms with the use of interference fringes thereby for recording information, and in which a reproduction beam similar to the reference beam is projected onto the recording layer to generate a diffraction beam to thereby reproduce the information the diffraction beam, wherein: provided are a crosstalk layer which is arranged directly on the recording layer or adjacent to the recording layer with a spacer layer interposed therebetween and has a thickness of 0.48 μm or more, and an erasing optical system which forms a crosstalk hologram by projecting an object beam for erasing and a reference beam for erasing onto the crosstalk layer; and the crosstalk layer is set to exhibit no sensitivity or very low sensitivity to interference fringes of the object beam and the reference beam at the time of recording of the data holograms.

(14) The holographic recording and reproducing apparatus according to (13), the object optical system and the reference optical system also serve as the erasing optical system.

(15) The holographic recording and reproducing apparatus according to (13), wherein the erasing optical system projects onto the crosstalk layer the object beam for erasing and the reference beam for erasing each of which has a wavelength different from that of the object beam and the reference beam at the time of recording.

(16) The holographic recording and reproducing apparatus according to any one of (13) to (15), wherein: the recording layer has a thickness of $t_1$; N data holograms can be angle-multiplex-recorded in one point in the recording layer; and a thickness $t_2$ of the crosstalk layer is $t_2 < t_1/N$.

(17) The holographic recording and reproducing apparatus according to any one of (13) to (16), wherein a spatial light modulator for subjecting the object beam for erasing to random amplitude modulation is provided in the erasing optical system.

(18) The holographic recording and reproducing apparatus according to any one of (13) to (17), wherein: a phase spatial light modulator for phase-code-modulating the reference beam is provided in the reference optical system; and a phase spatial light modulator for erasing which phase-code-modulates the reference beam for erasing by means of a pattern which is not orthogonal to a phase code employed in the recording is provided in the erasing optical system.

BEST MODE FOR CARRYING OUT THE INVENTION

Figure 1:
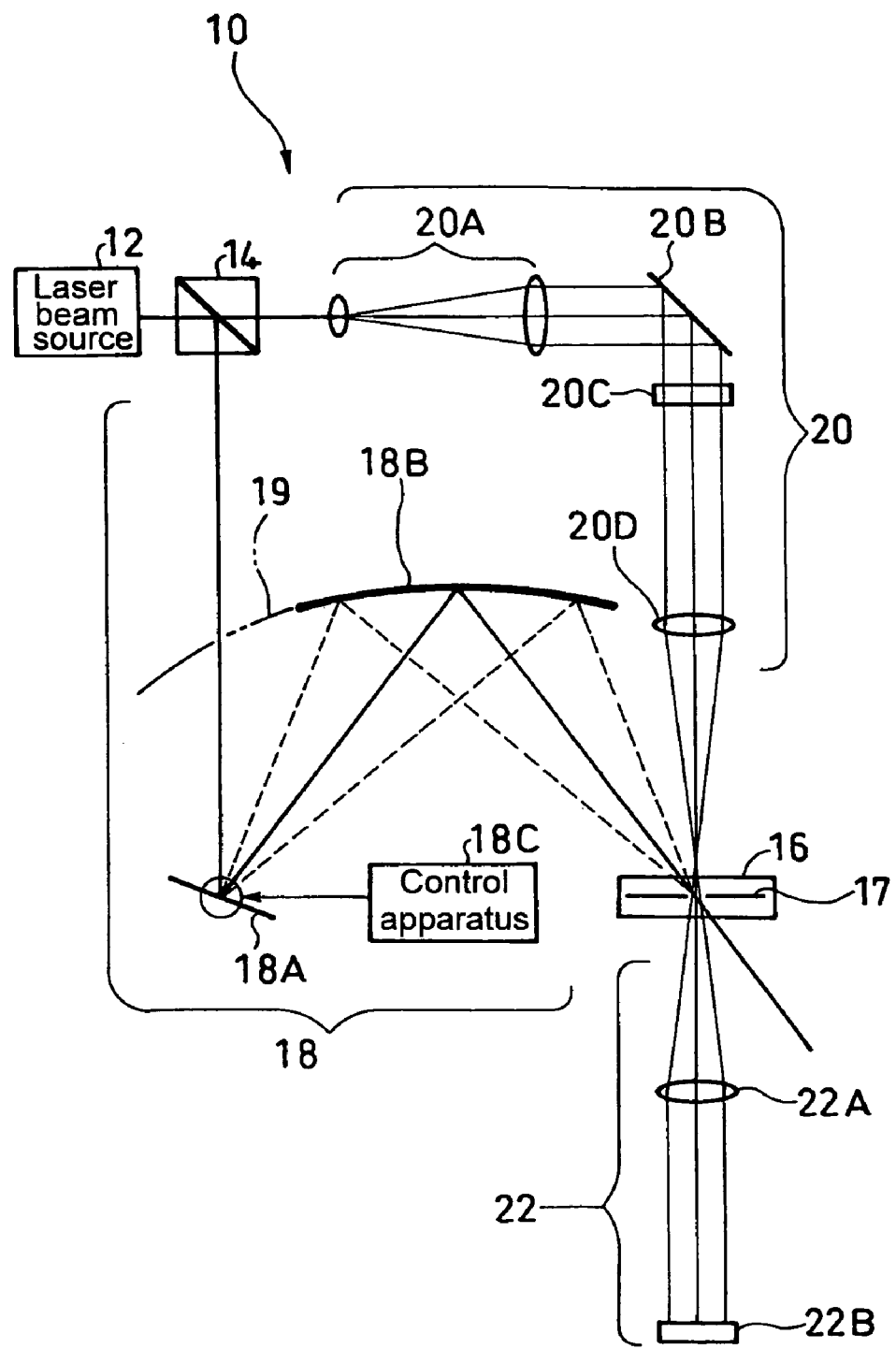
FIG. 1 is an optical system diagram illustrating a holographic recording and reproducing apparatus according to a first embodiment of the present invention.

A holographic recording medium is constituted by a first substrate, a second substrate, a recording layer which is provided between these substrates and in which data holograms can be multiplex-recorded, and a crosstalk layer which is provided between these substrates so as to be substantially adjacent to this recording layer. The abovementioned crosstalk layer is set to exhibit no sensitivity or very low sensitivity so as not to fully react to the fringes of an object beam and a reference beam at the time of the recording of the data holograms in the abovementioned recording layer. An object beam for erasing and a reference beam for erasing are projected onto the crosstalk layer at the Bragg condition same as that when the abovementioned data holograms are recorded, thereby forming a crosstalk hologram.

First Embodiment

A holographic recording and reproducing apparatus 10 according to a first embodiment of the present invention will be described hereinafter with reference to FIG. 1.

This holographic recording and reproducing apparatus 10 is configured to include: a laser beam source 12; a beam splitter 14 which splits the laser beam emitted from this laser beam source 12 into a reference beam (a reflection beam) and an object beam (a transmission beam); a holographic recording medium 16; a reference optical system 18 for guiding the abovementioned reference beam to the abovementioned holographic recording medium 16; an object optical system 20 for guiding the abovementioned object beam to the holographic recording medium 16; and an imaging optical system 22 for reproducing data through a diffraction beam generated when a reproduction beam is projected onto the abovementioned holographic recording medium 16.

The abovementioned reference optical system 18 is configured to include a rotation mirror 18A and a concave mirror 18B in this order from the side of the abovementioned beam splitter 14.

The abovementioned concave mirror 18B has a reflection surface along the inner surface of an imaginary ellipse 19 having focal points at the rotation center of the abovementioned rotation mirror 18A and at the intersection of a recording layer 17 in the abovementioned holographic recording medium 16 with the projection beam axis of the abovementioned object beam. The concave mirror 18B is designed such that, when the object beam reflected from the abovementioned beam splitter 14 is reflected by the rotation mirror 18A, the reflection beam from the abovementioned concave mirror 18B always passes through the intersection of the abovementioned recording layer 17 with the projection optical axis of the object beam. The reference numeral 18C in the figure designates a control apparatus for controlling the rotation angle of the abovementioned rotation mirror 18A.

The abovementioned object optical system 20 is configured to include a beam expander 20A for expanding the beam diameter of the laser beam having passed through the abovementioned beam splitter 14, a mirror 20B, a spatial light modulator 20C, and a Fourier lens 20D which are arranged in this order from the side of the abovementioned beam splitter 14.

The abovementioned spatial light modulator 20C is designed to perform amplitude modulation according to the data to be recorded in the abovementioned holographic recording medium 16 for providing the object beam with the data.

The abovementioned imaging optical system 22 is configured to include an imaging lens 22A and an imaging device 22B arranged in this order from the side of the abovementioned holographic recording medium 16.

Next, with reference to FIG. 2, the configuration of the abovementioned holographic recording medium 16 will be described in detail.

Figure 2:
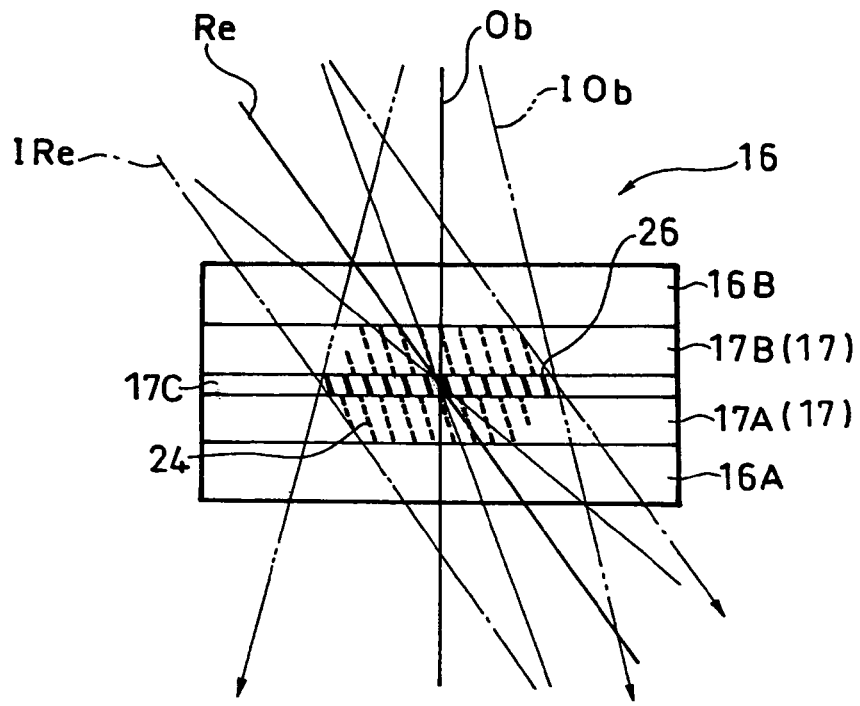
FIG. 2 is an enlarged cross-sectional view schematically illustrating the relationship in the first embodiment among a holographic recording medium, a reference beam, an object beam, a reference beam for erasing, an object beam for erasing, a data hologram, and a crosstalk hologram.

As schematically enlarged in FIG. 2, the holographic recording medium 16 is configured to include, between a first substrate 16A and a second substrate 16B, the abovementioned recording layer 17 formed of two separated-split recording layers 17A and 17B and a crosstalk layer 17C formed between the abovementioned separated-split recording layers 17A and 17B.

In the abovementioned split recording layers 17A and 17B, a grating can be formed through the interference fringes of the object beam from the abovementioned object optical system 20 and the reference beam from the reference optical system 18.

Further, the abovementioned crosstalk layer 17C is designed to have a thickness smaller (1/100 to 1/5) than the total thickness of the split recording layers 17A and 17B and the crosstalk layer 17C, and is designed such that the abovementioned object and reference beams at the time of recording satisfy the Bragg condition over a wide incident angle range.

Moreover, as in the abovementioned split recording layers 17A and 17B, the crosstalk layer 17C is formed of, for example, a photopolymer or a photorefractive crystal. However, a material is employed in which the photosensitivity is not fully exhausted after the projection of the object and reference beams onto the recording layer 17 at the time of recording, which does not react to slight exposure during storage, and which can exhibit photosensitivity even after an archival compensation period elapses after completion of holographic recording to the recording layer 17.

In this case, the abovementioned crosstalk layer 17C may be formed of a photopolymer which develops photosensitivity through a polymerization initiator having an absorption edge at a wavelength shorter than those of recording beams (the object beam and the reference beam) or a dichroic holographic material in which the photosensitivity can be turned ON-OFF by the presence or absence of a gate beam. Further, the crosstalk layer 17C may be formed of a photorefractive material exhibiting photosensitivity only under the presence of an electrostatic field.

As mentioned above, the thickness of the crosstalk layer 17C is set thinner than that of the split recording layers 17A and 17B. However, in order to achieve the function as a volume hologram, the thickness must be at least 0.48 μm or more (the details will be described later).

Next, a description will be given of a process of recording-reproducing and erasing information by means of the abovementioned holographic recording and reproducing apparatus 10.

First, the laser beam emitted from the laser beam source 12 is split into a reflection beam serving as the reference beam and a transmission beam serving as the object beam by means of the beam splitter 14.

The reference beam enters the reference optical system 18, is reflected by the rotation mirror 18A and the concave mirror 18B, and is projected onto the recording layer 17 of the holographic recording medium 16.

Here, the rotation center of the rotation mirror 18A and the intersection of the recording layer 17 with the optical axis of the object beam serve as the respective two focal points of the imaginary ellipse 19. Therefore, the reference beam is always incident on the recording layer 17 irrespective of the rotation angle of the rotation mirror 18A.

Therefore, while the projection position of the reference beam onto the holographic recording medium 16 is fixed, the incident angle thereto is changed by the abovementioned rotation mirror 18A and the abovementioned concave mirror 18B, thereby achieving angle multiplex recording through this action.

The beam diameter of the object beam having entered the abovementioned object optical system 20 is expanded by the beam expander 20A, and the beam is then reflected by the mirror 20B and enters the spatial light modulator 20C.

In the spatial light modulator 20C, the object beam is amplitude-modulated according to information (data) to be recorded to thereby provide the object beam with the data.

This object beam having the data provided with is Fourier transformed by the abovementioned Fourier lens 20D at the focal point thereof and is incident on the abovementioned recording layer 17. As shown in FIG. 2, in the recording layer 17, a data hologram 24 is formed which corresponds to the interference fringes of the projected object beam Ob and reference beam Re.

During reproduction, all the pixels of the abovementioned spatial light modulator 20C are turned OFF, and only the reference beam Re is projected onto the holographic recording medium 16 as a reproduction beam. At this time, the incident angle of the reproduction beam is adjusted according to the hologram desired to be reproduced as in the case of the reference beam Re at the time of recording, and an object beam containing the data is reproduced as a diffraction beam from the data hologram 24.

During the recording as above, when the object beam and the reference beam are projected onto the recording layer 17, the beams are also applied to the abovementioned crosstalk layer 17C. However, the crosstalk layer 17C has low photosensitivity to the object beam Ob and the reference beam Re. Thus, even if the crosstalk layer 17C slightly reacts to the beams, the photosensitivity thereof is not fully exhausted even after data holograms are formed all over the recording layer 17, and thus a crosstalk hologram 26 can be formed.

Further, the abovementioned reproduction beam at the time of reproduction has the same wavelength as that of the abovementioned reference beam, and the incident angle thereof is also the same as that of the reference beam. Therefore, the crosstalk layer 17C does not react to the reproduction beam, or, even if the crosstalk layer 17C reacts to the reproduction beam, the extent of the reaction is very small.

Next, a description will be given of a process of forming the crosstalk hologram 26 for substantially erasing the data holograms 24 recorded in the abovementioned recording layer 17.

In this erasing process in the holographic recording and reproducing apparatus 10, the object optical system 20 and the reference optical system 18 the same as those at the time of the abovementioned recording are employed as an erasing optical system, and an object beam IOb for erasing and a reference beam IRe for erasing are projected therefrom onto a large area of the crosstalk layer 17C, as shown in FIG. 2. Particularly, the reference beam IRe for erasing has a large beam diameter (2 to 10 times the beam diameter at the time of recording) in a collimated area. Further, random amplitudes are given to the object beam IOb for erasing in the spatial light modulator 20C, and the object beam IOb for erasing is then projected as a diffused beam.

In this case, for example, as shown by an alternate long and short dash line in FIG. 2, the reference beam IRe for erasing similar to the abovementioned reference beam is projected such that the center thereof is aligned along the incident angle at the central position in the modulation range of the incident angle of the reference beam Re. At the same time, the object beam IOb for erasing is projected at the same incident angle as that of the object beam to thereby form the crosstalk hologram 26 in the crosstalk layer 17C.

Figure 3:
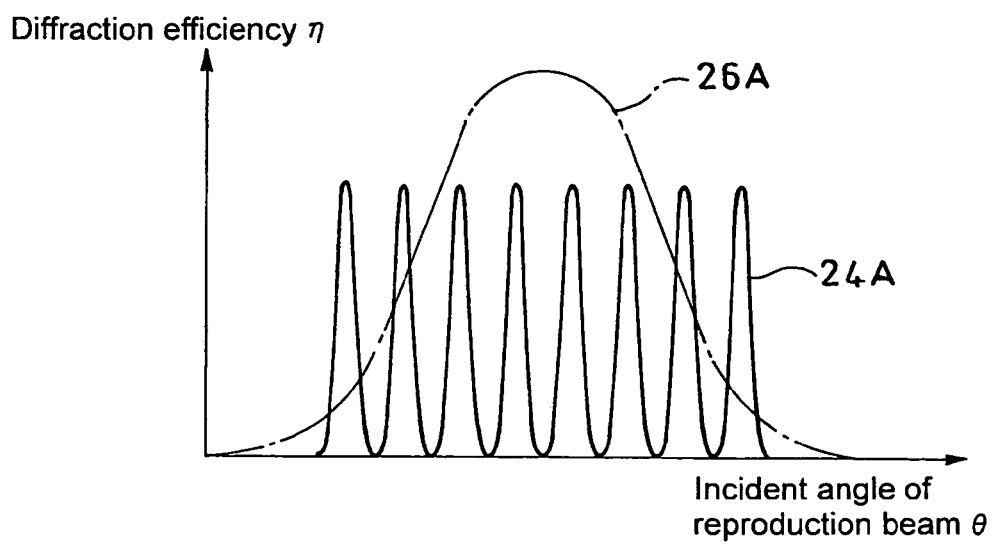
FIG. 3 is a diagram showing the relationship in the first embodiment between the incident angle of a reproduction beam and diffraction efficiency when the data hologram and the crosstalk hologram are reproduced.

Since the abovementioned crosstalk layer 17C is thinner than the recording layer 17, the Bragg condition is satisfied over a wide range of the incident angle of the object beam IOb for erasing and the reference beam IRe for erasing each of which has the wavelength the same as that of the abovementioned object and reference beams at the time of recording. In FIG. 3, the relationship between the abovementioned incident angle and diffraction efficiency is shown by an alternate long and short dash line 26A for the crosstalk hologram 26 and by a solid line 24A for the data holograms 24. Thus, the selectivity of the crosstalk hologram 26 is found to be low.

Figure 4:
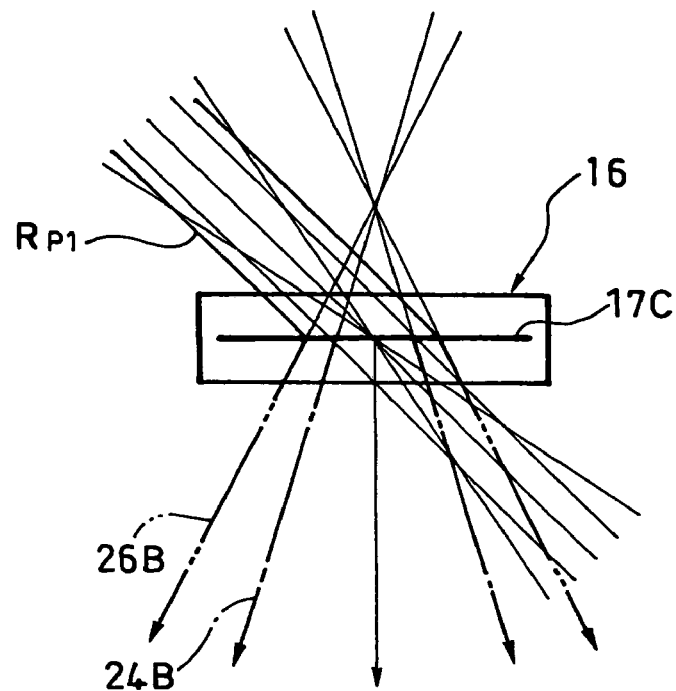
FIG. 4 is an enlarged cross-sectional view schematically illustrating the state of a diffraction beam when the reproduction beam is projected onto the holographic recording medium at different incident angles.
Figure 4:
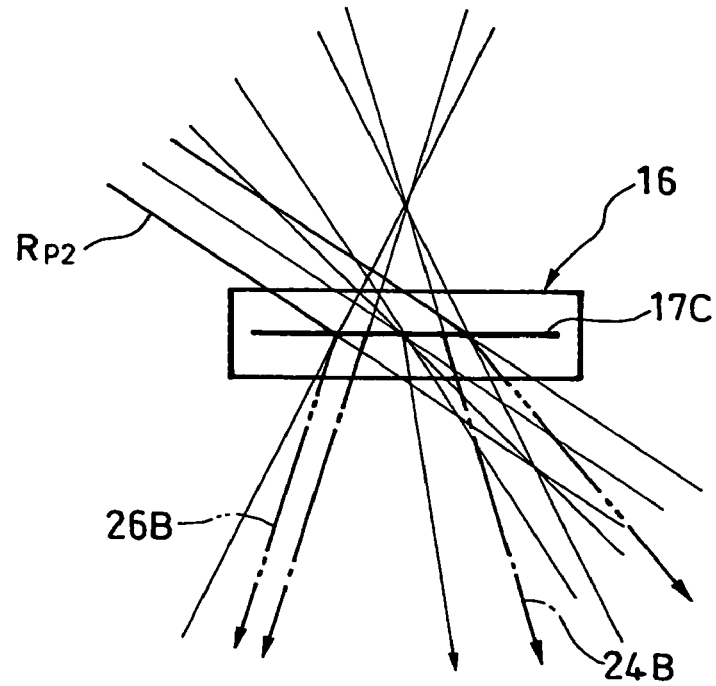

If the recording layer 17 as above is irradiated with the reproduction beam (the reference beam) in a similar manner as above to reproduce the data, a reproduction image 24B of the data hologram and a reproduction image 26B of the reproduction hologram are always formed in a superposed manner for each of the reproduction beams $R_{p1}$ and $R_{p2}$ having different incident angles, as shown in FIGS. 4(A) and (B). In other words, the crosstalk hologram 26 is always reproduced concurrently over a wide range of the incident angle of the reproduction beam. Therefore, the data is substantially disabled to be reproduced, or is erased.

Next, with reference to FIGS. 5 to 7, a more detailed description will be given of the manner in which the abovementioned data hologram 24 and the abovementioned crosstalk hologram 26 are reproduced.

Figure 5:
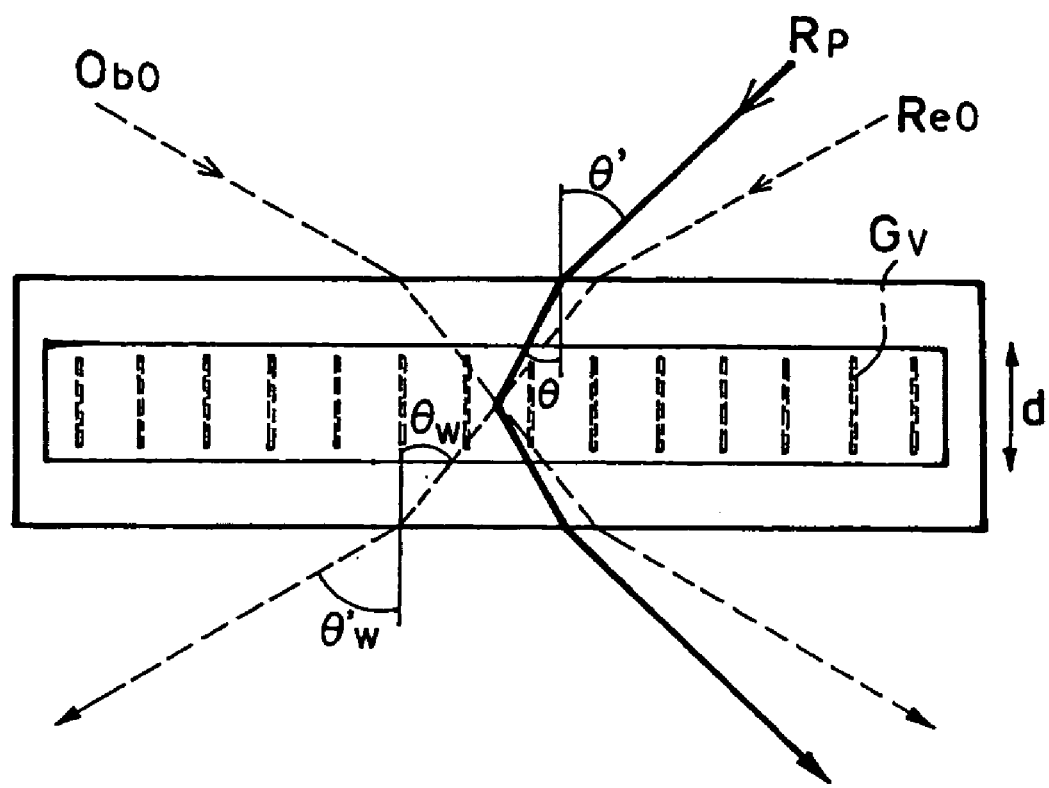
FIG. 5 is an enlarged cross-sectional view schematically illustrating the state at the time of hologram reproduction in a general holographic recording medium.

Generally, holograms are recorded in advance through a reference beam $Re_0$ and an object beam $Ob_0$ shown by dotted lines in FIG. 5, and the interference fringes formed by the two laser beams are held as a grating (a diffraction grating) Gv.

During reproduction, diffraction efficiency becomes maximum when a reproduction beam Rp is incident on the holographic recording medium 16 at the same incident angle as that of the reference beam (or the object beam) at the time of recording. Equations (1) to (3) represent the extent to which the diffraction efficiency is reduced when the incident angle is changed.

$$\eta = \sin^2\sqrt{(\Phi^2+\chi^2)}/(1+\chi^2/\Phi^2) \quad (1)$$

$$\Phi = \pi \Delta n d / \lambda \cos \theta_w \quad (2)$$

$$\chi = 2\pi d / \lambda \Box \Delta\theta \sin \theta_w \quad (3)$$

Here, $\eta$ represents the diffraction efficiency, or the intensity ratio of the diffraction beam to the incident reproduction beam. $\Phi$ is the optical thickness of a hologram normalized by the wavelength of the reproduction beam and is hereinbelow referred to as a holographic thickness. Also, $\chi$ indicates how the "deviation" of the reproduction beam from the reference beam (or the object beam) at the time of recording and is referred to as a "Bragg mismatch." The Bragg mismatch $\chi$ depends on a variation $\Delta\lambda$ in wavelength and a variation $\Delta\theta$ in incident angle, but in this case it is assumed that a wavelength shift is not present ($\Delta\lambda=0$). $\Delta n$ is the contrast of a refractive index distribution forming a grating (a refractive index modulation degree), d is the thickness of a photosensitive layer. $\theta_w$ is the incident angle at the time of recording, and $\theta$ is the incident angle at the time of reproduction. Further, the difference between the incident angles is defined as $\Delta\theta=\theta-\theta_w$.

Figure 6:
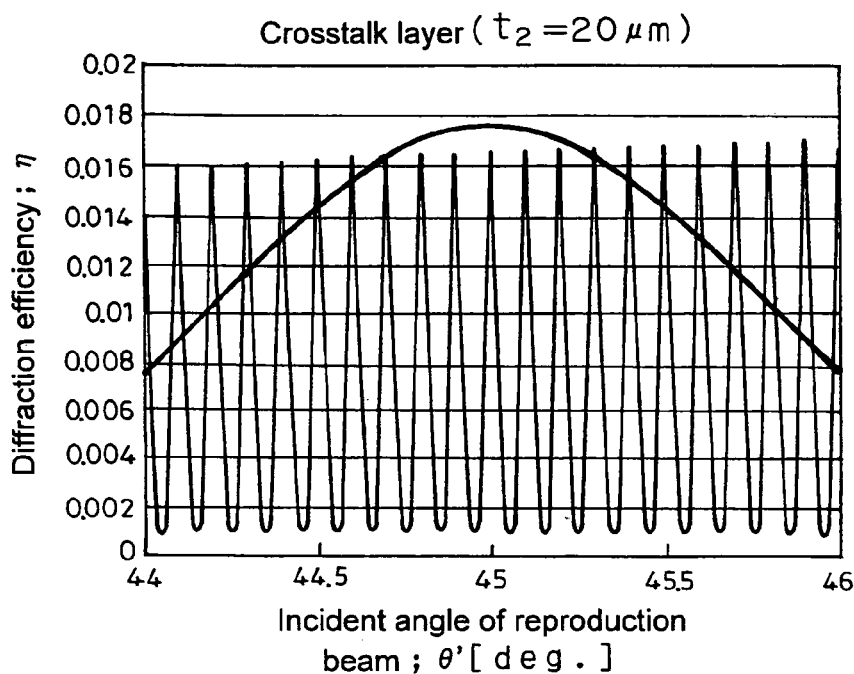
FIG. 6 is a diagram showing the relationship in the first embodiment between the incident angle of the reproduction beam and the diffraction efficiency in the state in which the reproduction of multiplexed data holograms is disabled through one crosstalk hologram.
Figure 7:
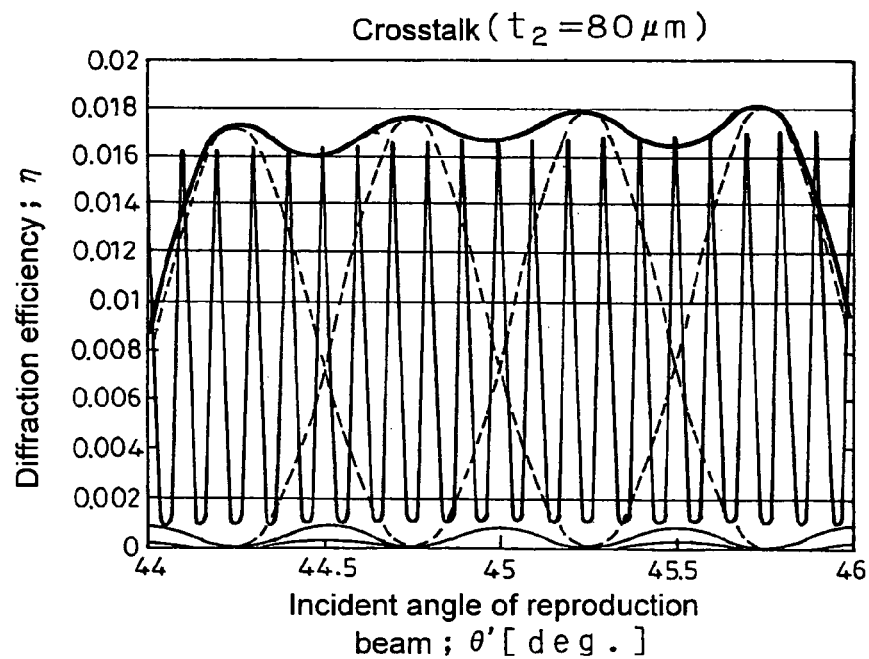
FIG. 7 is a diagram showing the relationship between the incident angle of the reproduction beam and the diffraction efficiency when the reproduction of multiplexed data holograms is disabled through a plurality of crosstalk holograms.

FIGS. 6 and 7 show the relationship between an exterior incident angle $\theta'$ and the diffraction efficiency while taking into account the effects of refraction in the surface of a recording medium. Here, the reduction of the diffraction efficiency due to surface reflection is neglected.

A fine peak in the figures represents the diffraction efficiency from a data hologram ($t_1=d=1$ mm), and a peak having a broad width represents the diffraction efficiency from a crosstalk hologram. In either case, the thickness of the data hologram is set to d=1 mm, and the refractive index modulation degree is set to $1\times10^{-5}$. In addition, adjacent holograms are recorded by tilting the reference beam by a pitch of 0.1°. On the other hand, in the crosstalk hologram, the thickness is set to $t_2=0.02$ mm in FIG. 6, and the thickness is set to $t_2=0.08$ mm in FIG. 7. As the thickness changes, the peak value of the diffraction efficiency changes. However, in this case, $\Delta n$ is adjusted such that the peak values for the data and the crosstalk are approximately the same.

In practice, as can be found from the above equations, if $\chi=0$ and $\Phi$ is small, the diffraction efficiency $\eta$ is proportional to the square of ($\Delta n d$). In other words, if $\Delta n=5\times10^{-4}$ in FIG. 6 and $\Delta n=1\times10^{-4}$ in FIG. 7, approximately the same diffraction efficiency is obtained.

As the simplest method for embodying the present invention, multiplexed data holograms are brought to a state in which the reproduction is disabled by means of one crosstalk hologram as shown in FIG. 6.

Alternatively, the same function may be obtained by superposing a plurality of crosstalk holograms as shown in FIG. 7. In FIG. 7, the peaks shown by dotted lines correspond to respective four angle-multiplexed crosstalk holograms. The peak having a broad width (a solid line) is the sum for the four holograms and represents the actually observed diffraction efficiency.

Here, the case in which 21 data pages are superposed is exemplified. However, in practice, several hundreds to several thousands or more holograms are occasionally angle-multiplex-recorded, and thus sufficient functions could not be obtained unless a plurality of crosstalk holograms are superposed. This is because a volume phase type hologram is assumed as the crosstalk hologram and a lower limit (normally several μm, to be described later) exists for the thickness of the recording layer. However, when a plurality of crosstalk holograms are superposed, crosstalk layers of the same number as the crosstalk holograms are not necessarily laminated, and a plurality of crosstalk holograms may be angle-multiplex-recorded in one crosstalk layer.

In the case of FIG. 7 above, a plurality of crosstalk holograms must be recorded while the incident angle of the reference beam for erasing is changed, thereby causing an increase in the time or cost required for data erasing. Therefore, the lesser the number of the superposed crosstalk holograms, the better. For this purpose, it is preferable that the thickness of the crosstalk layer be made as thin as possible and all the data holograms be covered with a small number of crosstalk holograms. However, in order to obtain the function as a volume hologram, a certain thickness determined by an optical system or the like must be provided, and this defines the lower limit of the thickness of the crosstalk layer.

The data holograms are formed to satisfy the following conditions.

λ: 532 nm
n: 1.52
Δn: 1E-05
d: 1 mm
$\theta_w$: 45 deg.
$\theta_{int}$: 0.1 deg.
Λ: 0.376 μm
K: 16.7 μm$^{-1}$ Here, Λ is the period of grating, and K is the wave number of grating (K=2π/Λ). Further, $\theta_{int}$ represents the angular pitch between data holograms.

The condition for representing characteristics as a volume hologram is, $$Q=2\pi\lambda d/n\Lambda^2 \cos\theta > 10. \quad (4)$$

By substituting the abovementioned parameter values, a lower limit value for the crosstalk layer thickness of 0.57 μm is obtained. Here, although θ'=45° (θ=27.7°) has been employed, a minimum thickness in the above equation is given at a critical angle $\theta_c = \sin^{-1}(1/n)$. Thus, $$Q=2\pi\lambda d/n\Lambda^2 \cos\{\sin^{-1}(1/n)\} > 10. \quad (5)$$

Therefore, the minimum value of the crosstalk layer thickness becomes 0.48 μm.

Typical values for hologram recording are employed as each of the parameters employed in each of the abovementioned equations. However, in order to correctly give the conditions for achieving the effects of the present invention, the conditions for the abovementioned Q value must be applied. The reason why of the above condition is that not only the incident angle at the time of recording but also a wavelength, a grating period, and a refractive index can have various values.

Figure 8:
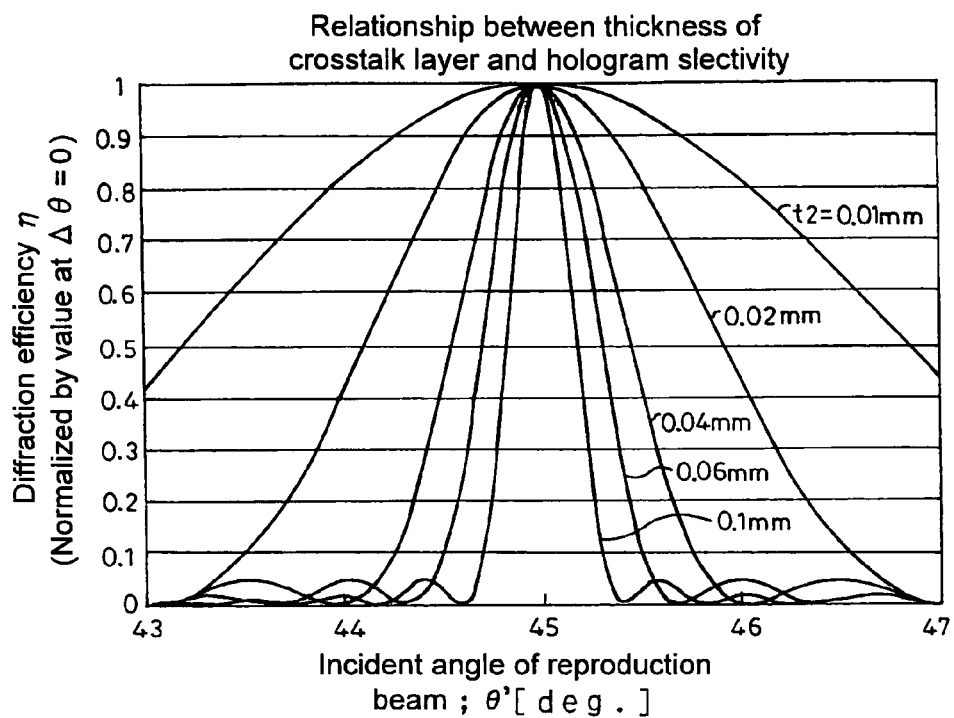
FIG. 8 is a diagram showing, through the use of the relationship between the incident angle of the reproduction beam and the diffraction efficiency, the change of Bragg selectivity of a crosstalk hologram when the thickness of a crosstalk layer is changed.

The minimum thickness of the crosstalk layer has been determined by use of the abovementioned equations (4) and (5). On the contrary, if the crosstalk layer is thick, no limitation is imposed in principle (see FIG. 8). FIG. 8 shows how the Bragg selectivity of a crosstalk hologram changes when the thickness of the crosstalk layer is changed. The values of the diffraction efficiency have been normalized by the respective peak values.

As can be seen from the above equations (1) to (3), even if the thicknesses of holograms are different, the same diffraction efficiency can be obtained when the products Δnd of the refractive index modulation degree and the thickness are the same. If the thickness is halved, the diffraction efficiency is the same when Δn is doubled. According to FIG. 8, the thickness $t_2$ of the crosstalk layer is inversely proportional to the half-width of the peak of the diffraction efficiency. With all these considered, it can be said that "no upper limit is imposed on the thickness for the crosstalk layer to exhibit its function." This is because, even if $t_2$ is doubled and the half-width of the peak is halved, Δn is also halved, and thus two same crosstalk holograms can be recorded in a crosstalk layer. If these two crosstalk holograms are multiplexed with an appropriate angular interval, it is possible to disable the reproduction of data holograms in approximately the same angular range as that in the first case (the case before $t_2$ is doubled). However, since the two crosstalk holograms must be recorded, labor increases.

A practical crosstalk layer satisfies the condition that "the reproduction of all the data holograms can be disabled by one crosstalk hologram." In this case, the upper limit of the thickness is as follows. That is, in hologram selectivity, the peak width of the diffraction efficiency is inversely proportional to the thickness. Thus, assuming that the number of data holograms angle-multiplex-recorded in one point is N, the upper limit of the crosstalk hologram is given by $t_2 < t_1/N$.

Next, a description will be given of a mechanism when a crosstalk hologram prevents the reproduction of data holograms.

First, the diffraction beam amount of a crosstalk hologram is not necessarily approximately the same as that of data holograms (in FIGS. 6 and 7, approximately the same diffraction efficiency is given for simplicity).

Figure 9:
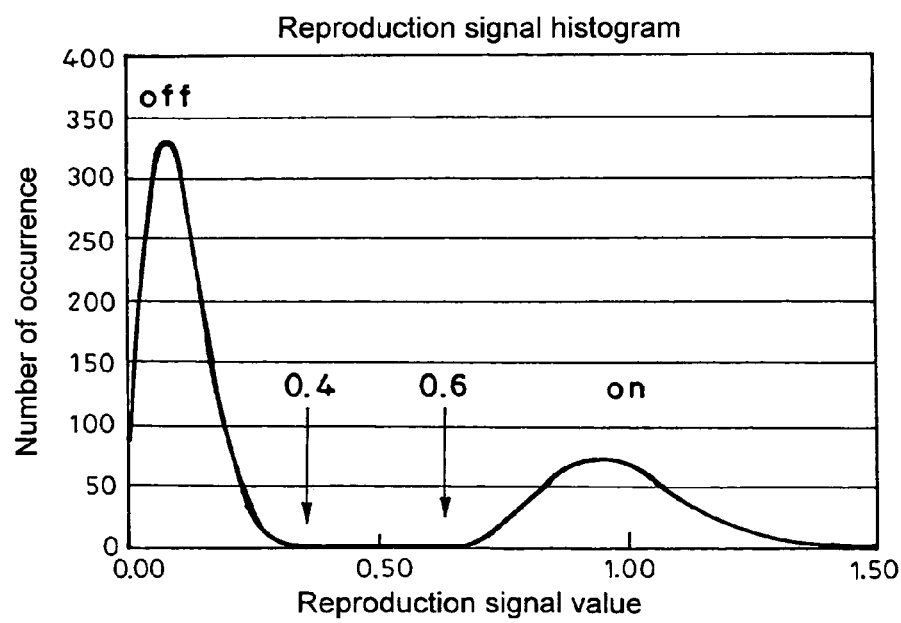
FIG. 9 is a histogram showing the relationship between a reproduction signal value for each pixel and a number of occurrence when a reproduction image from a data hologram is captured by an imaging device.

FIG. 9 is a histogram of a detected beam amount (a reproduction signal) of each pixel when a reproduction image (a diffraction beam) from a data hologram is taken by the imaging device. Ideally, an on-signal and an off-signal should be detected as beam amounts of 1 and 0, respectively. However, the signals have a distribution broadened by noise including optical interference between pixels.

In order to make the description simple, the threshold values of the on- and off-signals are defined as 0.6 and 0.4, respectively. Consideration is given to the case in which a diffraction image through a crosstalk hologram is superposed on the reproduction image. The diffraction efficiency of the crosstalk hologram is assumed to be α times that of the data holograms. For each of (data, crosstalk) pixel combinations including (on, on), (on, off), (off, on), and (off, off), a beam amount to be detected is computed.

The results show that the threshold value (the maximum value) of the beam amount when the data is "off" is 0.4+α (for the case of off, on), and the threshold value (the minimum value) of the beam amount when the data is "on" is 0.6−α (for the case of on, off).

This is because the pixel pattern of the crosstalk hologram has a random array irrespective of the pixel pattern of the data holograms. In other words, if α is larger than 0.1, the "on" and the "off" are mixed in a detected image from the data holograms, thereby interfering with satisfactory reproduction. In practical holographic recording-reproducing systems, the abovementioned threshold values (such as 0.4 and 0.6) are determined according to an encoding method or an error correction method in these systems. Generally, since an error correctable bit error ratio (before correction) is about $10^{-3}$, it is sufficient even if α is slightly larger than 0.1 (for example 0.11).

Second Embodiment

Figure 10:
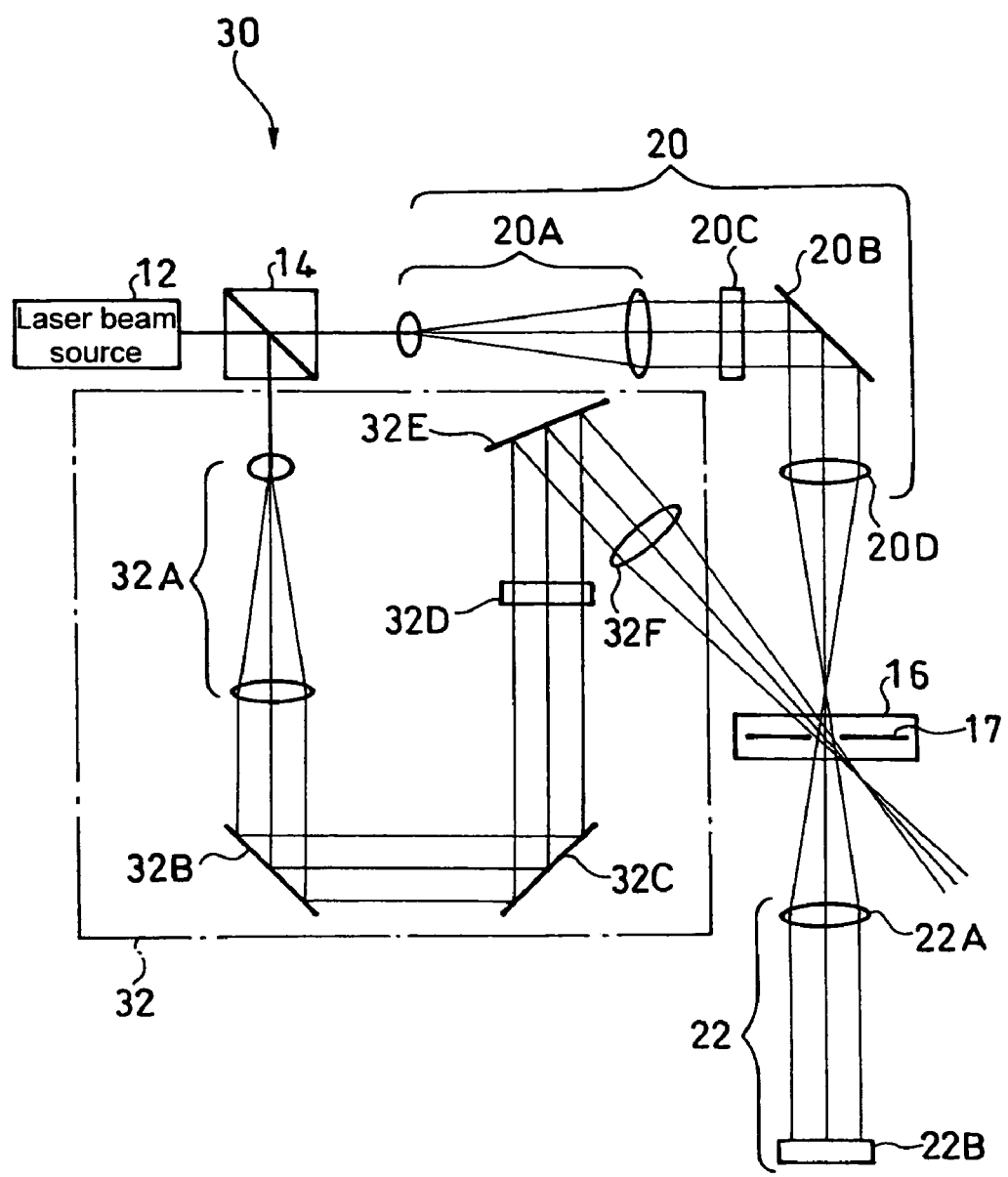
FIG. 10 is an optical system diagram illustrating a holographic recording and reproducing apparatus according to a second embodiment of the present invention.

Next, a description will be given of a holographic recording and reproducing apparatus 30 shown in FIG. 10 according to a second embodiment of the present invention.

This holographic recording and reproducing apparatus 30 is for phase-code multiplex recording, and a crosstalk hologram is also provided with a phase-code pattern.

This holographic recording and reproducing apparatus 30 has a reference optical system having a configuration different from that of the abovementioned holographic recording and reproducing apparatus 10 shown in FIG. 1, but the other configurations are the same. Thus, the same numerals are assigned to the portions common to the holographic recording and reproducing apparatus 10, and the description therefor is omitted.

A reference optical system 32 in this holographic recording and reproducing apparatus 30 is constituted by: a beam expander 32A for expanding the beam diameter of the laser beam reflected by the beam splitter 14; a pair of mirrors 32B and 32C; a phase spatial light modulator 32D; a mirror 32E; and a Fourier lens 32F which are arranged in this order from the side of the beam splitter 14.

When data is recorded and reproduced by means of this holographic recording and reproducing apparatus 30, phase-code multiplex recording similar to conventional one is employed.

That is, the object beam is provided with data as amplitude modulation by means of the spatial light modulator 20C in the object optical system 20. Further the reference beam is provided with address as phase-modulation by means of the phase spatial light modulator 32D in the reference optical system 32. The object and reference beams are collected by the Fourier lenses 20D and 32F, respectively, and are projected onto the holographic recording medium 16.

As in the angle multiplex recording in the first embodiment above, the object beam for erasing and the reference beam for erasing are projected onto the holographic recording medium 16 through the object optical system 20 and the reference optical system 32, respectively, in the holographic recording and reproducing apparatus 30.

Note that, for phase-code multiplex recording, both the object beam and the reference beam are not mechanically moved. Thus, in contrast to the case of angle multiplex recording, the beam diameter of the object beam at the time of crosstalk hologram recording is not required to be expanded.

During the abovementioned recording, the phase spatial light modulator 32D displays a pattern which is not orthogonal to any of phase codes at the time of recording.

As used herein, the phase code patterns being orthogonal means that, when pixels located at the same position in the two phase codes are multiplied, the sum over all the pixels is zero. Here, a phase modulation amount is θ, and the value of a pixel is given by exp (iθ).

According to the principle of the phase-code multiplex recording, holograms modulated by non-orthogonal phase codes cannot be separated from each other. Thus, when one of the holograms is reproduced, the other is also reproduced at the same time.

Therefore, since all the phase code patterns (the addresses) of the data holograms are not orthogonal to the crosstalk hologram during reproduction, when any of the data holograms is reproduced, the crosstalk hologram is concurrently reproduced. Thus, this means that the data is substantially erased.

Moreover, in the first and second embodiments above, the holographic recording medium 16 is configured by forming the crosstalk layer 17C between the two split recording layers 17A and 17B, but the present invention is not limited thereto. For example, as shown in FIG. 11(A), the crosstalk layer 17C may be provided adjacent to a side of a single-layered recording layer 17 which side is opposite to the incident direction of the object beam or the reference beam.

Figure 11:
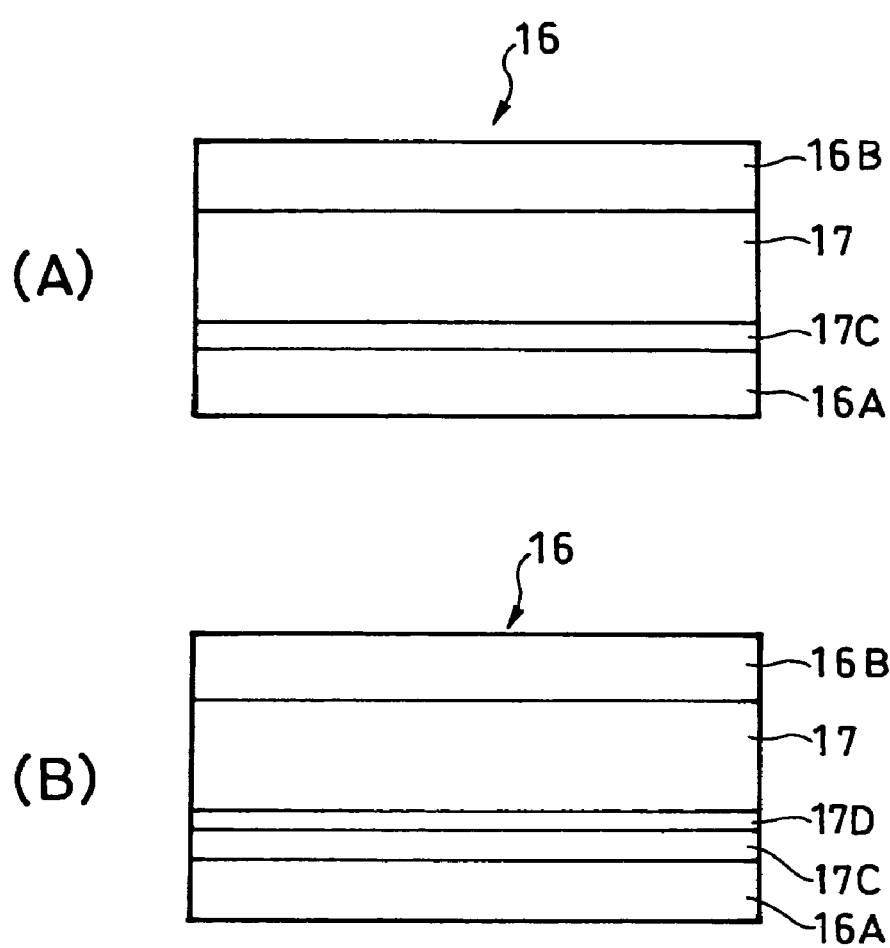
FIG. 11 is an enlarged cross-sectional view schematically illustrating modified examples of the configuration of the crosstalk layer.

Moreover, as shown in FIG. 11(B), a hard spacer layer 17D may be provided between the recording layer 17 and the crosstalk layer 17C in order to maintain stiffness.

In this case, the spacer layer 17D may be formed of, for example, a resin which cures by irradiation of a ray or may be formed by applying a sheet-like plastic.

In the first and second embodiments above, the object beam for erasing and the reference beam for erasing have the same wavelength as that of the object and reference beams at the time of recording, but the present invention is not limited thereto. An object beam for erasing and a reference beam for erasing each having different wavelengths may be employed.

In this case, a laser beam source must be provided separately from the laser beam source 12, or a device for converting the wavelength of a laser beam from the laser beam source 12 must be provided.

INDUSTRIAL APPLICABILITY

In the present invention, when the data holograms are formed in the recording layer of the holographic recording medium, the crosstalk layer hardly reacts to light. Further, after the crosstalk hologram is formed in the crosstalk layer, crosstalk always occurs during data hologram reproduction. Therefore, data reproduction is disabled, and the data is substantially erased.

The invention claimed is:

1. A holographic record erasing method, comprising projecting an object beam for erasing and a reference beam for erasing onto a crosstalk layer and forming a crosstalk hologram in the crosstalk layer in a superimposed manner with respect to data holograms multiplex-recorded in a recording layer of a holographic recording medium, the crosstalk layer being provided substantially adjacent to the recording layer, being formed of one of a photopolymer, a dichroic holographic material and a photorefractive material, the photopolymer develops photosensitivity through a polymerization initiator having an absorption edge at a wavelength shorter than those of an object beam and a reference beam, the photosensitivity in the dichroic holographic material can be turned ON-OFF by the presence or absence of a gate beam, and the photorefractive material exhibits photosensitivity only under the presence of an electrostatic field and being set to exhibit no sensitivity or very low sensitivity to interference fringes of the object beam and the reference beam at the time of data hologram recording in the recording layer, wherein: data holograms are angle-multiplex-recorded; and the reference beam for erasing has a beam diameter upon the projection onto the holographic recording medium 2 to 10 times the diameter of a beam which is projected onto the holographic recording medium at the time of data hologram recording.

2. The holographic record erasing method according to claim 1, wherein the reference beam for erasing is projected onto the holographic recording medium at an incident angle within an incident angle range of the reference beam at the time of recording.

3. The holographic record erasing method according to claim 2, wherein the reference beam for erasing is projected simultaneously or sequentially at a plurality of incident angles at an angular interval which corresponds to a plurality of angular pitches between the data holograms.

4. The holographic record erasing method according to claim 1, wherein the reference beam for erasing is projected simultaneously or sequentially at a plurality of incident angles at an angular interval which corresponds to a plurality of angular pitches between the data holograms.

5. The holographic record erasing method according to claim 1, wherein the object beam for erasing is subjected to random amplitude modulation.

6. The holographic record erasing method according to claim 1, wherein the object beam for erasing is projected through an objective lens having a numerical aperture smaller than a numerical aperture of an objective lens for projecting the object beam at the time of recording of the data hologram.

7. The holographic record erasing method according to claim 1, wherein: the data holograms are phase-code-multiplex-recorded; and a reference beam for erasing is subjected to phase-code-modulation by means of a pattern which is not orthogonal to a phase-code employed at the time of recording.

* * * * *